US007012929B2

(12) United States Patent
Umayabashi

(10) Patent No.: US 7,012,929 B2
(45) Date of Patent: Mar. 14, 2006

(54) SYSTEM AND METHOD FOR ASSIGNING TIME SLOTS IN COMMUNICATION SYSTEM AND NETWORK-SIDE APPARATUS USED THEREFOR

(75) Inventor: Masaki Umayabashi, Tokyo (JP)

(73) Assignee: NEC Corporation, Tokyo (JP)

( * ) Notice: Subject to any disclaimer, the term of this patent is extended or adjusted under 35 U.S.C. 154(b) by 844 days.

(21) Appl. No.: 09/934,986

(22) Filed: Aug. 22, 2001

(65) Prior Publication Data

US 2002/0024971 A1 Feb. 28, 2002

(30) Foreign Application Priority Data

Aug. 23, 2000 (JP) ............................. 2000-251773

(51) Int. Cl.
*H04L 12/43* (2006.01)
(52) U.S. Cl. ...................................... 370/458; 370/468
(58) Field of Classification Search ................ 370/329, 370/345, 348, 458, 468, 375, 402
See application file for complete search history.

(56) References Cited

U.S. PATENT DOCUMENTS

| 6,091,740 A | * | 7/2000 | Karasawa | 370/458 |
| 6,243,364 B1 | * | 6/2001 | Pihlaja | 370/294 |
| 6,298,049 B1 | * | 10/2001 | Vanhoof et al. | 370/329 |
| 6,424,656 B1 | * | 7/2002 | Hoebeke | 370/412 |
| 6,587,443 B1 | * | 7/2003 | Dutta | 370/322 |
| 6,671,260 B1 | * | 12/2003 | Engstrand | 370/238 |
| 6,747,990 B1 | * | 6/2004 | Umayabashi et al. | 370/468 |
| 6,813,255 B1 | * | 11/2004 | Goderis et al. | 370/335 |

FOREIGN PATENT DOCUMENTS

| JP | 10-23055 | 1/1998 |
| JP | 10-242981 | 9/1998 |
| JP | 11-341037 | 12/1999 |
| JP | 2000-209176 | 7/2000 |

* cited by examiner

*Primary Examiner*—Kwang Bin Yao
*Assistant Examiner*—Blanche Wong
(74) *Attorney, Agent, or Firm*—Dickstein, Shapiro, Morin & Oshinsky, LLP.

(57) ABSTRACT

The present invention comprises a plurality of terminal-side apparatuses each having a buffer, a queue length notification module, and an output control module, and a network-side apparatus having a fairness guarantee/high efficiency hybrid time slot assignment control module (FG/HE HTSAC module). The FG/HE HTSAC module assigns time slots to all or a part of the terminal-side apparatuses in accordance with a fairness criteria. If the number of the time slots assigned exceeds a queue length for one or more terminal-side apparatuses, leftover time slots are reassigned among the terminal-side apparatus(es) where the number of the time slots assigned thereto does not exceed a queue length. The result of reassignment is notified to an output control circuit that controls output of cells from the buffer.

48 Claims, 9 Drawing Sheets

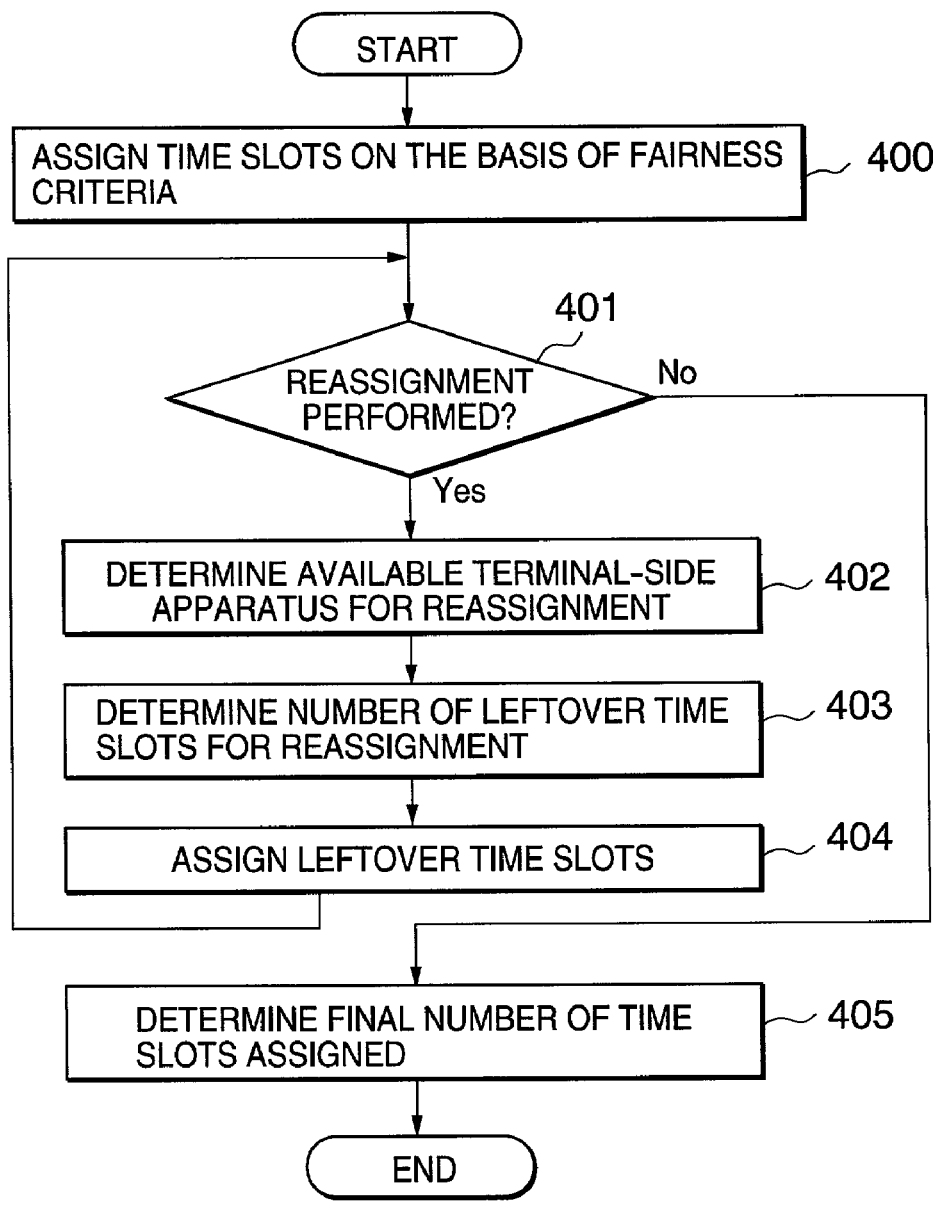

FIG.5

| FAIRNESS CRITERIA |
|---|
| ASSIGN TIME SLOTS EQUALLY TO TERMINAL-SIDE APPARATUSES |
| ASSIGN TIME SLOTS IN PROPORTION TO SUM OF GUARANTEED MINIMUM BANDWIDTHS FOR CONNECTIONS IN TERMINAL-SIDE APPARATUSES |
| ASSIGN TIME SLOTS IN PROPORTION TO SUM OF MAXIMUM BANDWIDTHS FOR CONNECTIONS IN TERMINAL-SIDE APPARATUSES |
| ASSIGN TIME SLOTS IN PROPORTION TO DIFFERENCE BETWEEN SUM OF MAXIMUM BANDWIDTHS AND SUM OF GUARANTEED MINIMUM BANDWIDTHS FOR CONNECTIONS IN TERMINAL-SIDE APPARATUSES |
| ASSIGN TIME SLOTS IN PROPORTION TO NUMBER OF CONNECTIONS IN TERMINAL-SIDE APPARATUSES |
| ASSIGN A PART OF TOTAL TIME SLOTS EQUALLY TO TERMINAL-SIDE APPARATUSES AND THEN ASSIGN REMAINING TIME SLOTS IN PROPORTION TO SUM OF GUARANTEED MINIMUM BANDWIDTHS SUM OF MAXIMUM BANDWIDTHS, DIFFERENCE BETWEEN SUM OF MAXIMUM BANDWIDTHS AND SUM OF GUARANTEED MINIMUM BANDWIDTHS FOR CONNECTIONS IN TERMINAL-SIDE APPARATUSES, OR IN PROPORTION TO NUMBER OF CONNECTIONS |

FIG.6

| REASSIGNMENT ALGORITHM |
|---|
| ASSIGN BASED ON THE FAIRNESS CRITERIA USED IN THE PRIMARY ASSIGNMENT (SEE FIG.5) FOR REASSIGNMENT (FAIRNESS ALGORITHM) |
| QUEUE LENGTH AVERAGING ASSIGNMENT SUCH THAT THE VALUE OBTAINED BY SUBTRACTING THE NUMBER OF THE PRIMARILY ASSIGNED TIME SLOTS FROM THE QUEUE LENGTH BECOMES EQUAL OR SIMILAR TO EACH OTHER IN THE AVAILABLE TERMINAL-SIDE APPARATUSES FOR REASSIGNMENT (DISTRIBUTED MINIMUM ALGORITHM) |
| ASSIGNMENT OF THE TIME SLOTS IN PROPORTION TO THE QUEUE LENGTH IN THE AVAILABLE TERMINAL SIDE APPARATUSES FOR REASSIGNMENT (PACKET RATIO ALGORITHM) |

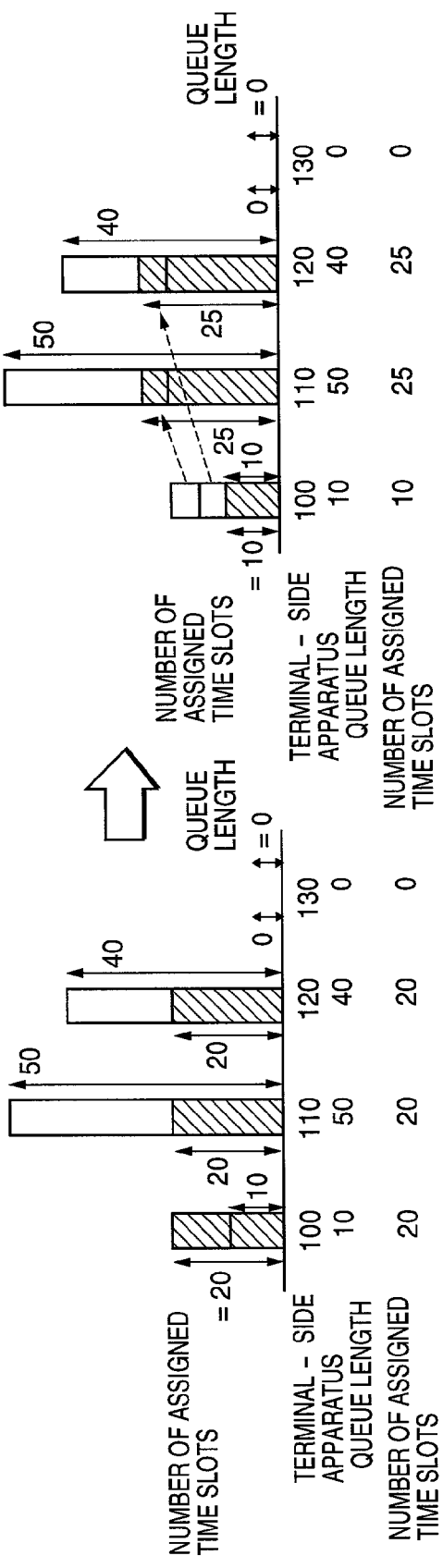
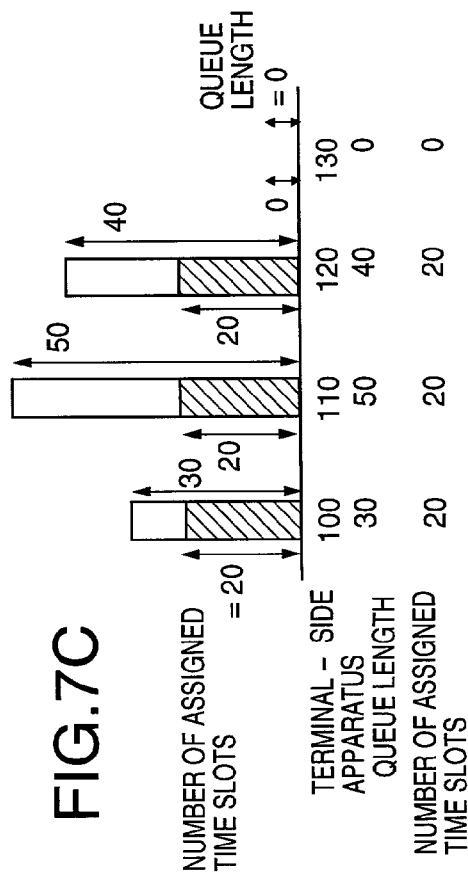
FIG.7A  FIG.7B  FIG.7C

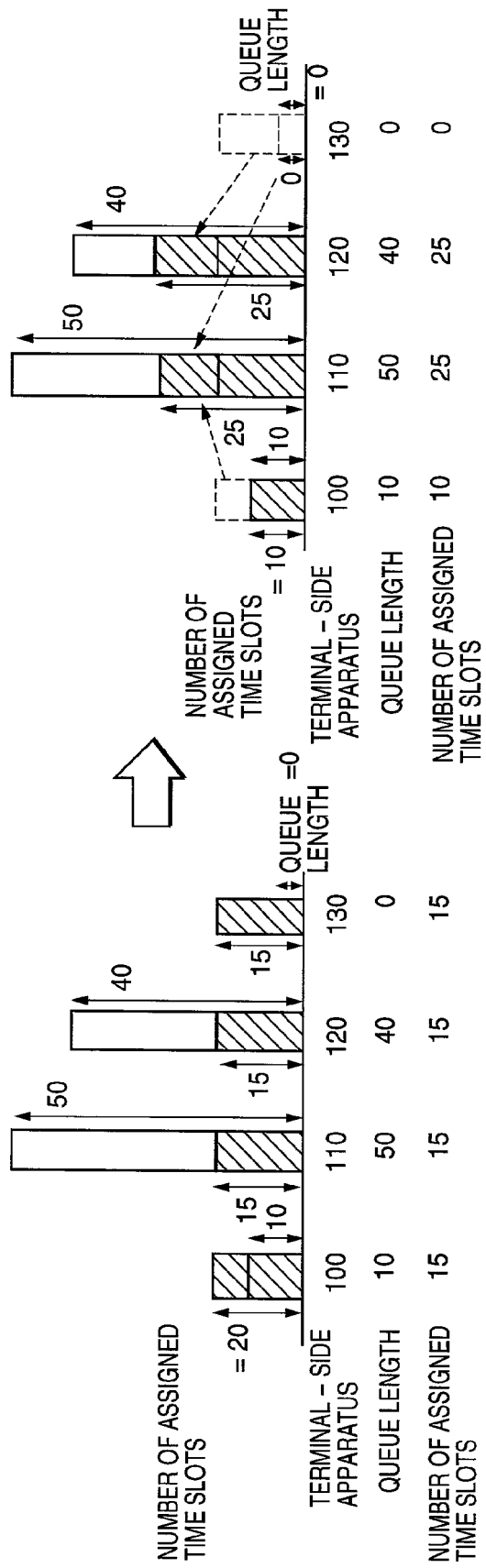

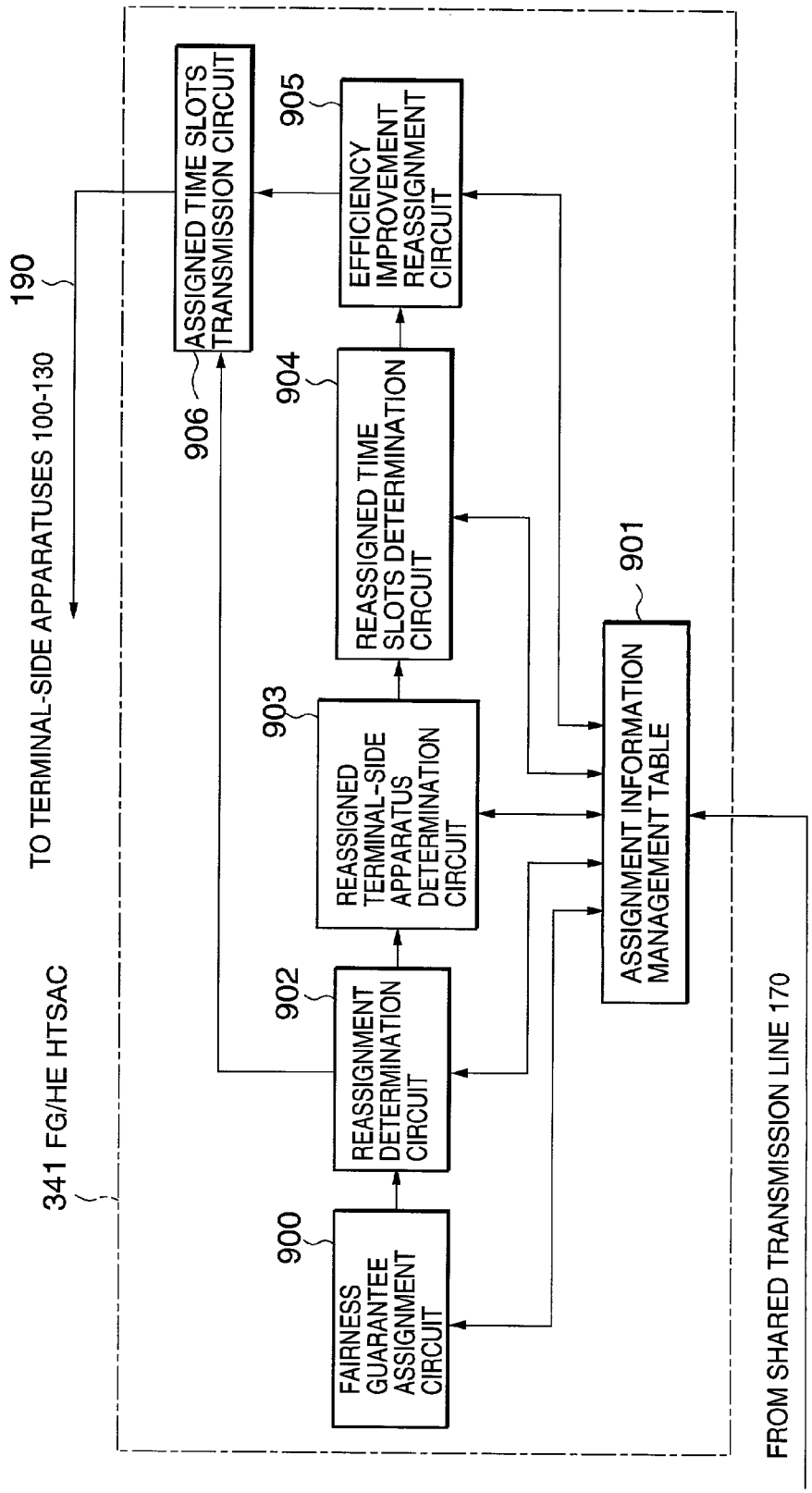

FIG.10

| # OF TERMINAL - SIDE APPARATUS | QUEUE LENGTH FIELD 911 | ASSIGNED TIME SLOTS FIELD 912 | REASSIGNMENT FLAG FIELD 913 |
|---|---|---|---|
| | QUEUE LENGTH | NUMBER OF TIME SLOTS ASSIGNED | AVAILABILITY FOR REASSIGNMENT |
| 100 | 10 | 15 | NOT AVAILABLE |
| 110 | 50 | 15 | AVAILABLE |
| 120 | 40 | 15 | AVAILABLE |
| 130 | 0 | 15 | NOT AVAILABLE |

SYSTEM AND METHOD FOR ASSIGNING TIME SLOTS IN COMMUNICATION SYSTEM AND NETWORK-SIDE APPARATUS USED THEREFOR

BACKGROUND OF THE INVENTION

1. Field of the Invention

The present invention relates to a network-side apparatus in a communication system as well as a system and a method for assigning time slots by such a network-side apparatus. More specifically, the present invention relates to a method for dynamically assigning, by a network-side apparatus, time slots to terminal-side apparatuses through a shared media over a point to multipoint communication system on the basis of fluctuating traffic.

2. Description of the Related Art

Point to multipoint shared media communication systems comprise a single network-side apparatus connected to a plurality of terminal-side apparatuses. The terminal-side apparatuses share one or more physical media (channels). In other words, the shared physical medium is passively split among multiple terminal-side apparatuses that share the capacity of that medium. Such systems are expected to provide access networks at low costs. Asynchronous Transfer Mode-Passive Optical Networks (ATM-PONs) are an example of the point to multipoint shared media communication system.

FIG. 1 shows an ATM-PON system comprising four terminal-side apparatuses 100 to 130 and a single network-side apparatus 140. The network-side apparatus 140 in this system is connected to the terminal-side apparatuses 100 to 130 through two kinds of transmission lines in order to allow transmission of upstream signals from the terminal-side apparatuses 100 to 130 to the network-side apparatus 140. More specifically, each of the terminal-side apparatuses 100 to 130 is connected to an optical splitter/combiner 160 through individual transmission lines 150 to 153, respectively. The optical splitter/combiner 160 is connected in turn to the network-side apparatus 140 through a common transmission line (hereinafter, referred to as a "shared transmission line") 170. In order to avoid a collision of data (hereinafter, referred to as "cells") on the shared transmission line, the terminal-side apparatuses 100 to 130 each uses time slots assigned thereto by the network-side apparatus 140, while the terminal-side apparatuses 100 to 130 shares one frequency band and the network-side apparatus 140 uses a different frequency band.

There are many possibilities in the choice of bandwidth allocation strategy. Of these, assignment of time slots to the terminal-side apparatuses 100 to 130 on a fixed assigned basis is simple to achieve but it prevents efficient use of the bandwidths for the shared transmission line 170 when the terminal-side apparatuses generate bursty traffic of cells. This is because a fixed number of time slots are equally assigned to all terminal-side apparatuses regardless of fluctuation of traffic demands. Such inefficiency stands out more in systems with highly bursty traffic where each terminal-side apparatus makes communications over a best-effort service such as the Internet.

In order to make efficient use of the shared transmission line 170, the network-side apparatus 140 must assign the time slots dynamically on the basis of traffic conditions to the terminal-side apparatuses 100 to 130. In addition, since the channel capacity of the shared transmission line 170 is shared by a plurality of terminal-side apparatuses 100 to 130, it is also necessary to achieve fair bandwidth assignment to the terminal-side apparatuses 100 to 130.

A method for controlling assignment of time slots over a point to multipoint shared media communication system will be described in conjunction with FIG. 1. The terminal-side apparatus 100 comprises a buffer 101, a queue length notification module 102, and an output control module 103. The buffer 101 is connected to the queue length notification module 102 and the output control module 103. The buffer 101 is also connected to terminals 180 and 181 to store the incoming cells from the terminals. The queue length notification module 102 monitors a queue length (i.e., the number of cells stored in the buffer 101) and supplies information indicative of the queue length to the network-side apparatus 140. The output control module 103 controls transmission of cells from the buffer 101. While not being described individually, it is understood that the terminal-side apparatuses 110, 120, and 130 each comprises a similar configuration to that of the apparatus 100.

The network-side apparatus 140 comprises a dynamic time slot assignment control module 141 for use in determining assignment of the time slots to the terminal-side apparatuses 100 to 130. The system comprises a downstream transmission line 190 in order to allow transmission of downstream control signals, especially information indicative of assignment of the time slots, from the network-side apparatus 140 to the terminal-side apparatuses 100 to 130. While the downstream transmission line 190 illustrated in FIG. 1 connects the network-side apparatus 140 only with the terminal-side apparatus 100, it is apparent that the downstream transmission line 190 also connects the remaining terminal-side apparatuses 110 to 130 with the network-side apparatus 140.

There may be another system without the downstream transmission line 190. In this system, the information indicative of the time slot assignment is transmitted through the shared transmission line 170 and the individual transmission lines 150 to 153, from the network-side apparatus 140 to the terminal-side apparatuses 100 to 130.

With the above-mentioned configurations, cells are transmitted from the terminal-side apparatuses 100 to 130 to the network-side apparatus 140 in the manner described below.

Cells supplied from the terminals 180 and 181 to the buffer 101 are stored in the buffer 101. The queue length notification module 102 monitors the queue length and periodically supplies information indicative of the queue length to the network-side apparatus 140. The information indicative of the queue length is herein referred to as "queue length information". The dynamic time slot assignment control module 141 in the network-side apparatus 140 determines, in accordance with the queue length information, the number and position of the time slots to be assigned each terminal-side apparatus. The dynamic time slot assignment control module 141 supplies the information indicative of the number and position of the time slots to the output control modules 103 in the terminal-side apparatuses 100 to 130 through the downstream transmission line 190. The information indicative of the number and position of the time slots is herein referred to as "timeslot assignment information" for short.

The output control module 103 in the terminal-side apparatus transmits the cells in the buffer 101 to the network-side apparatus 140 in response to the timeslot assignment information. The cells from the terminal-side apparatuses 100 to 130 are transferred to a station (not shown) through the individual transmission lines 150 to 153, the optical splitter/ combiner 160, the shared transmission line 170, the network-side apparatus 140, and the transmission line 191.

The dynamic time slot assignment control module 141 in the network-side apparatus 140 determines whether there is any terminal-side apparatus in which the queue length exceeds the threshold value. If any, the network-side apparatus 140 divides the time slots into N number of slot groups and assigns the time slots on an equal basis to the N number of terminal-side apparatuses (wherein N represents the number of the terminal-side apparatuses in which the queue length exceeds the threshold value) to provide fair distribution of the time slots among the terminal-side apparatuses. The network-side terminal 140 then supplies information indicative of the assigned number of the time slots for each terminal-side apparatus through the downstream transmission line 190. The above-mentioned procedure to assign the time slots dynamically and fairly by the network-side apparatus to the terminal-side apparatuses is disclosed in, for example, Japanese Patent Laid-Open No. 10-242981.

Next, an example of this dynamic assignment will be described referring to FIG. 2. In FIG. 2, the queues in the buffers in the terminal-side apparatuses 100, 110, 120, and 130 have the lengths of 10, 50, 40, and 0, respectively. It is assumed that the threshold value is zero and the total number of the time slots available for the terminal-side apparatuses is 60. As mentioned above, the time slots are assigned only to the terminal-side apparatus(es) where the queue length exceeds the threshold value. Therefore, assignment is made to the terminal-side apparatuses 100, 110, and 120 in the illustrated example. The dynamic time slot assignment control module 141 divides the sixty time slots into three slot groups, twenty for each. Subsequently, dynamic time slot assignment control module 141 assigns the time slots equally to the terminal-side apparatuses 100, 110, and 120. As a result, the terminal-side apparatuses 100, 110, 120, and 130 are assigned with 20, 20, 20, and 0 numbers of the time slots. The hatched bar in FIG. 2 corresponds to the slot group containing equally assigned time slots.

As apparent from the above, the N number of terminal-side apparatuses where the queue length exceeds the threshold value are subject to equal assignment of the available time slots. This allows fair assignment of the time slots. However, it would lead to low bandwidth utilization levels when there is one or more terminal-side apparatuses to which time slots are assigned over their queue length. For example, the terminal-side apparatus 100 is assigned with the twenty time slots while the queue length therein corresponds to ten cells. Such "over-assignment" may deteriorate bandwidth utilization levels on the shared transmission line.

Therefore, an object of the present invention is to provide a system and a method for assigning time slots with which a network-side apparatus can assign time slots dynamically and fairly to terminal-side apparatuses by efficiently using bandwidths of a shared transmission line.

Another object of the present invention is to provide a network-side apparatus applicable to the above-mentioned system and method.

SUMMARY OF THE INVENTION

In the present invention, a plurality of terminal-side apparatuses are connected to a network-side apparatus through a shared transmission lines. The network-side apparatus is adapted to assign time slots to the terminal-side apparatuses. The terminal-side apparatus is adapted to transfer packets or cells to a transmission medium by using the time slots assigned to it.

Each terminal-side apparatus comprises buffering means for use in storing a packet to be transferred, and notification means for notifying the network-side apparatus of the number of packets stored in the buffering means.

The network-side apparatus receives, from the terminal-side apparatuses, information indicative of the number of packets stored in the buffering means in the terminal-side apparatuses. In response to this information, the network-side apparatus assigns time slots to the terminal-side apparatuses in accordance with a predetermined fairness criteria. Subsequently, the network-side apparatus determines whether there is a terminal-side apparatus with a time slot or slots excessively assigned. If it does, the network-side apparatus makes the excessive time slots be a subject of reassignment. The network-side apparatus further comprises control means for use in reassigning the time slots to one or more terminal-side apparatuses (herein referred to as an "available terminal-side apparatus for reassignment") except for those with the excessive time slots (herein referred to as a "non-available terminal-side apparatus for reassignment").

As apparent from the above, according to the present invention, the control means in the network-side apparatus first assigns the time-slots to the terminal-side apparatuses in accordance with the fairness criteria. If this results in over-assignment of the time slots, the network-side apparatus reassigns the leftover time slots to the terminal-side apparatus(es). The assignment and reassignment guarantees fairness among the terminal-side apparatuses and allows efficient assignment of the time slots.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIG. 4 is a control flow chart used in the time slot assignment according to the present invention;

FIG. 5 is a table indicating examples of fairness criteria according to the present invention;

FIG. 6 is a table indicating examples of reassignment procedures;

FIG. 7A is a view for use in describing operation of time slot assignment according to an embodiment of the present invention;

FIG. 7B is a view for use in describing operation of time slot assignment according to an embodiment of the present invention;

FIG. 7C is a view for use in describing operation of time slot assignment according to an embodiment of the present invention;

FIG. 8A is a view for use in describing operation of time slot assignment according to another embodiment of the present invention;

FIG. 8B is a view for use in describing operation of time slot assignment according to another embodiment of the present invention;

FIG. 9 is a block diagram showing a configuration of a fairness guarantee/high efficiency hybrid time slot assignment control module for use in implementing the time slot assignment according to the present invention; and FIG. 10 is an example of an assignment information management table for use in implementing the time slot assignment according to the present invention.

DESCRIPTION OF THE PREFERRED EMBODIMENTS

Figure 1:
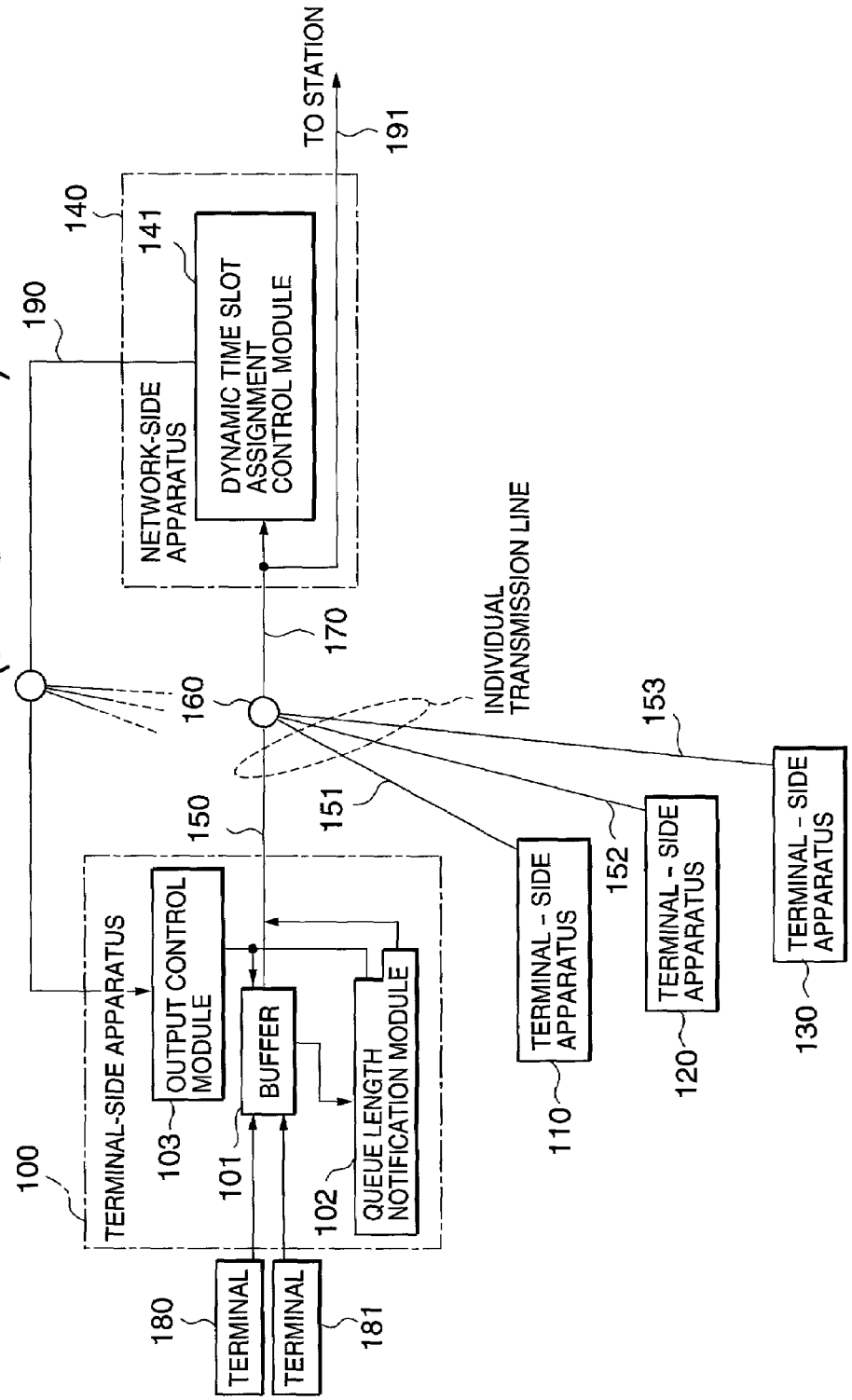
FIG. 1 is a block diagram showing a configuration of a point to multipoint shared media communication system for use in implementing conventional time slot assignment.
Figure 2:
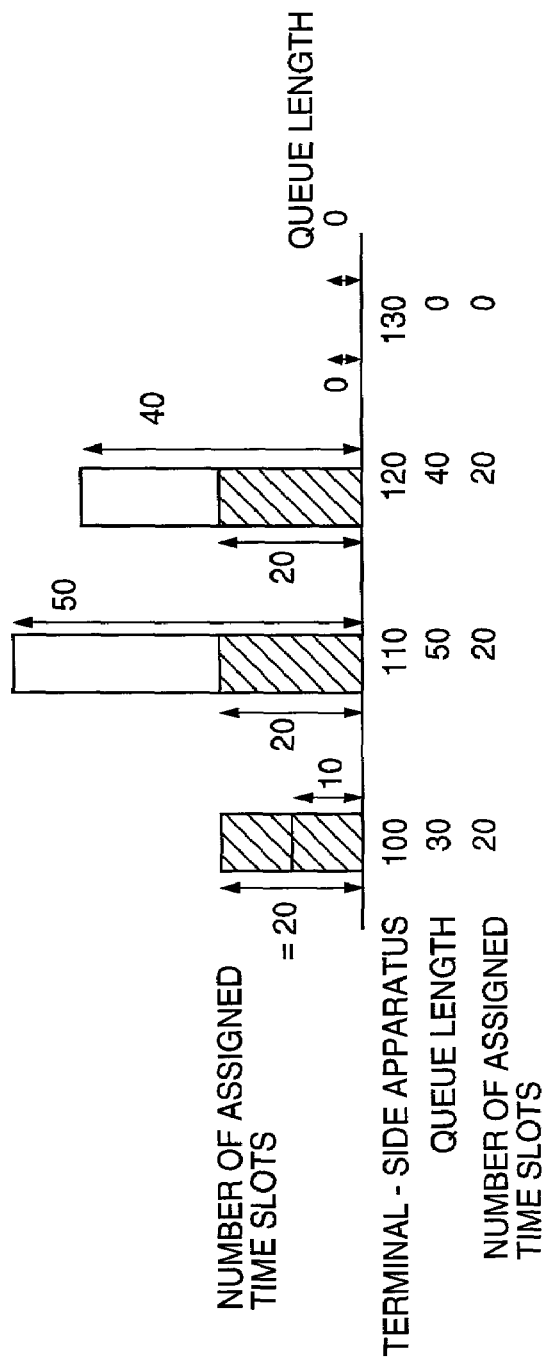
FIG. 2 is a view for use in describing operation of the conventional time slot assignment.
Figure 3:
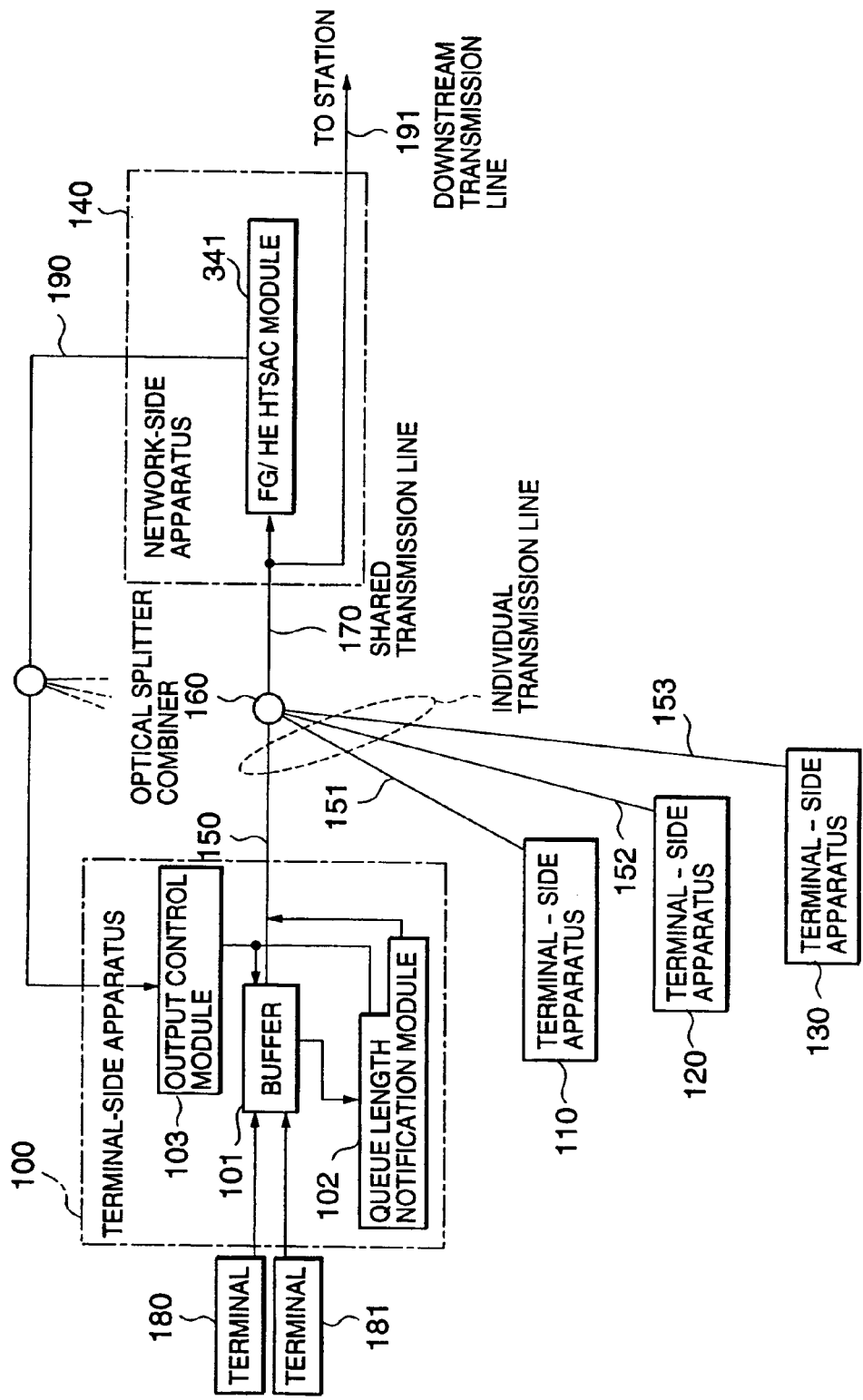
FIG. 3 is a block diagram showing a configuration of a point to multipoint shared media communication system for use in implementing time slot assignment according to the present invention.

A first embodiment of the present invention will be described with reference to the drawings. FIG. 3 shows a point to multipoint shared media communication system for use in implementing time slot assignment according to the present invention. This point to multipoint shared media communication system comprises a fairness guarantee/high efficiency hybrid time slot assignment control module (hereinafter, referred to as "FG/HE HTSAC module") 341 in place of the dynamic time slot assignment control module 141 shown in FIG. 1. In FIG. 3, similar components and parts to those described in conjunction with FIG. 1 are represented by the same reference numerals and description of such components is omitted.

Now, operations of the communication system configured as illustrated in FIG. 3 will be described. The terminal-side apparatuses 100 to 130 receive incoming cells from the terminals 180 and 181 and transfer them to FG/HE HTSAC module 341 in the network-side apparatus 140. This transfer is similar to that achieved by the conventional communication system described above. The FG/HE HTSAC module 341 in the network-side apparatus 140 receives the queue length information from the queue length notification modules in the terminal-side apparatuses 100 to 130. In response to the queue length information, the FG/HE HTSAC module 341 in the network-side apparatus 140 computes, according to the following procedures, the number of the time slots to be assigned to the terminal-side apparatuses 100 to 130. The network-side apparatus 140 then produces information indicative of the number of the time slots to be assigned to each of the terminal-side apparatuses 100 to 130. The assignment information is supplied to the terminal-side apparatuses 100 to 130 through the downstream transmission line 190.

FIG. 4 is a flow chart used by the FG/HE HTSAC module 341 in the network-side apparatus 140 to assign the time slots to the terminal-side apparatuses. At step 400, the FG/HE HTSAC module 341 assigns the time slots to the terminal-side apparatuses 100 to 130 on the basis of the fairness criteria. The fairness criteria as used herein means criteria for fairness applied to distribute the time slots to the terminal-side apparatuses with fairness.

For example, FIG. 5 gives different fairness criteria:

The FG/HE HTSAC module 341 assigns time slots equally to the terminal-side apparatuses 100 to 130;

The FG/HE HTSAC module 341 assigns time slots in proportion to the sum of guaranteed minimum bandwidths for the connections in the terminal-side apparatuses 100 to 130;

The FG/HE HTSAC module 341 assigns time slots in proportion to the sum of maximum band widths for the connections in the terminal-side apparatuses 100 to 130;

The FG/HE HTSAC module 341 assigns time slots in proportion to the difference between the sum of maximum bandwidths and the sum of guaranteed minimum bandwidths for the connections in the terminal-side apparatuses 100 to 130;

The FG/HE HTSAC module 341 assigns time slots in proportion to the number of connections in the terminal-side apparatuses 100 to 130; and The FG/HE HTSAC module 341 assigns a part of total time slots equally to the terminal-side apparatuses 100 to 130 and then assigns the remaining time slots in proportion to the sum of guaranteed minimum bandwidths, the sum of maximum bandwidths, the difference between the sum of maximum bandwidths and the sum of guaranteed minimum bandwidths for the connections in the terminal-side apparatuses 100 to 130, or in proportion to the number of connections.

The assignment performed at the step 400 on the basis of the fairness criteria is hereinafter referred to as the "primary assignment". The time slots assigned per terminal-side apparatus during the primary assignment is hereinafter referred to as the "primarily assigned time slots". At step 401, the FG/HE HTSAC module 341 determines whether or not reassignment should be performed for efficiency improvement. More specifically, the FG/HE HTSAC module 341 compares, for each terminal-side apparatus, the number of the primarily assigned time slots with the queue length. If there is any terminal-side apparatus where the number of the primarily assigned time slots exceeds the queue length, the difference between them is designated as a primary leftover time slot or slots. The FG/HE HTSAC module 341 performs reassignment of the primary leftover time slot(s) for efficiency improvement in order to avoid deterioration of bandwidth utilization levels. This operation is herein referred to as the "primary reassignment" for the purpose of clarity.

On the contrary, if the number of the primarily assigned time slots is smaller than the queue length for all terminal-side apparatuses 100 to 130, then process goes to the operation at step 405 without reassignment. This is because fairness is assured among the terminal-side apparatuses 100 to 130 and there is no over-assignment of the time slots, indicating that the available bandwidth is fully utilized.

If the step 401 is positive, the FG/HE HTSAC module 341 determines, at step 402, to which terminal-side apparatus or apparatuses the primary leftover time slot(s) should be reassigned. The primary leftover time slot(s) can be assigned to the terminal-side apparatus with the primarily assigned times lots smaller than the queue length. Such a terminal-side apparatus is herein referred to as the "available terminal-side apparatus for reassignment". The remaining terminal-side apparatus is herein referred to as the "non-available terminal-side apparatus for reassignment".

At step 403, the FG/HE HTSAC module 341 determines the number of the primary leftover time slots. If there are two or more non-available terminal-side apparatuses for reassignment, the number of the time slots to be reassigned is the sum of the primary leftover time slots in these apparatuses. After the determination of the primary leftover time slots, the queue length is used as the number of the time slots assigned to the non-available terminal-side apparatus for reassignment.

At step 404, the FG/HE HTSAC module 341 carries out the primary reassignment for efficiency improvement. More specifically, the FG/HE HTSAC module 341 assigns the primary leftover time slots to the available terminal-side apparatus (es) for reassignment. The reassignment may be made using various algorithms, and some of which are indicated in FIG. 6. The algorithms shown in FIG. 6 are:

assignment based on the fairness criteria used in the primary assignment (see, FIG. 5) for reassignment (Fairness algorithm);

queue length averaging assignment such that the value obtained by subtracting the number of the primarily assigned time slots from the queue length becomes equal or similar to each other in the available terminal-side apparatuses for reassignment (Distributed Minimum algorithm); and assignment of the time slots in proportion to the queue length in the available terminal-side apparatuses for reassignment (Packet Ratio algorithm).

After the step 404, operation of the FG/HE HTSAC module 341 returns to the step 401 in FIG. 4. It is noted that the number of the total time slots assigned to the available terminal-side apparatus(es) may exceed the queue length therein after the primary reassignment. In such a case, the FG/HE HTSAC module 341 designates an excessive time slot or slots as a secondary leftover time slot or slots and repeats the procedures from the step 402 to reassign the secondary leftover time slots to the terminal-side apparatus (es). This operation is herein referred to as the "secondary reassignment". More specifically, the FG/HE HTSAC module 341 determines whether there is any terminal-side apparatus with the number of time slots exceeding the queue length (step 401). If the step 401 is positive, the FG/HE HTSAC module 341 designates the corresponding terminal-side apparatus as the non-available terminal-side apparatus for reassignment. The FG/HE HTSAC module 341 designates the queue length in that non-available terminal-side apparatus for reassignment as the number of the time slots assigned thereto. Subsequently, the FG/HE HTSAC module 341 determines the number of the second leftover time slots, that is, the difference between the queue length and the number of the time slots already assigned during the primary assignment and the primary reassignment (step 403) Thereafter, the FG/HE HTSAC module 341 performs the secondary reassignment (step 404) In this way, the FG/HE HTSAC module 341 repeats the above-mentioned procedures until the number of the total time slots assigned becomes equal to or smaller than the queue length for all terminal-side apparatuses.

Finally, at the step 405, the FG/HE HTSAC module 341 determines the final number of the time slots assigned to each terminal-side apparatus. If the primary (secondary) reassignment has been performed for efficiency improvement, the FG/HE HTSAC module 341 sums up, as the final number of the time slots assigned for a terminal-side apparatus, the primarily assigned time slots and the portion of the leftover time slots assigned to that apparatus during the primary and secondary reassignments. On the other hand, if reassignment is not performed, the number of the primarily assigned time slots obtained at the step 401 is determined as the final number of the time slots.

It is noted that no terminal-side apparatus may become available for reassignment before completion of the operation even though one or more time slots still remain without being assigned. In such a case, the FG/HE HTSAC module 341 assigns all of the remaining time slots to all terminal-side apparatuses according to the fairness criteria used at the step 400.

FIG. 7 shows an example of assignment achieved using the above-mentioned procedure. In FIG. 7A, the queues in the buffer 101 in the terminal-side apparatuses 100, 110, 120, and 130 have the lengths of 10, 50, 40, and 0, respectively. In FIG. 7C, the queues in the buffer 101 in the terminal-side apparatuses 100, 110, 120, and 130 have the lengths of 30, 50, 40, and 0, respectively. It is assumed that the total number of the time slots available for the terminal-side apparatuses is 60. Under such circumstances, the time slots are to be assigned to the terminal-side apparatuses 100, 110, and 120. The terminal-side apparatus 130 is not subjected to assignment because the queue length does not exceed the threshold value. Therefore, the numbers of the time slots assigned to the terminal-side apparatuses 100, 110, 120, and 130 in accordance with the fairness criteria are 20, 20, 20, and 0, respectively.

In FIG. 7C, the number of the time slots assigned in accordance with the fairness criteria is smaller than the queue length for all terminal-side apparatuses 100 to 130. The FG/HE HTSAC module 341 determines at the step 401 not to perform reassignment for efficiency improvement accordingly.

In FIG. 7A, on the contrary, the FG/HE HTSAC module 341 assigns, at the step 400 in FIG. 4, the time slots equally to the terminal-side apparatuses 100, 110, and 120 where the queue length exceeds the threshold value of zero (that is, the queue length is not equal to zero). As a result, twenty time slots are assigned as the primarily assigned time slots to each of the terminal-side apparatuses 100 to 120 in accordance with the fairness criteria. As apparent from the figure, the number (i.e., 20) of the primarily assigned time slots exceeds the queue length (i.e., 10) for the terminal-side apparatus 100. Therefore, the FG/HE HTSAC module 341 determines at the step 401 in FIG. 4 that the reassignment should be performed for efficiency improvement.

In the example shown in FIG. 7A, the number of the primarily assigned time slots is smaller than the queue length for the terminal-side apparatuses 110 and 120, so that the FG/HE HTSAC module 341 determines, at the step 402, these terminal-side apparatuses to be "available terminal-side apparatus for reassignment".

At the step 403, the FG/HE HTSAC module 341 calculates the difference between the number of the primarily assigned time slots (i.e., 20 in this case) and the queue length (i.e., 10) for the terminal-side apparatus 100. The FG/HE HTSAC module 341 designates the difference (i.e., 10) as the primary leftover time slots. The FG/HE HTSAC module 341 then determines the queue length (i.e., 10) in the terminal-side apparatus 100 as the number of the time slots assigned thereto.

At the step 404, the FG/HE HTSAC module 341 reassigns the ten leftover time slots to the terminal-side apparatuses 110 and 120, as shown in FIG. 7B. In this example, the FG/HE HTSAC module 341 uses the equivalent assignment to reassign the time slots. As a result, the terminal-side apparatuses 110 and 120 are reassigned with five primary leftover time slots each. Alternatively, if the FG/HE HTSAC module 341 uses the queue length averaging assignment algorithm, then the terminal-side apparatuses 110 and 120 are reassigned with ten and zero primary leftover time slots, respectively. If the FG/HE HTSAC module 341 reassigns the primary leftover time slots in proportion to the queue length, then the terminal-side apparatuses 110 and 120 are reassigned with six and four primary leftover time slots, respectively.

At the step 405, the FG/HE HTSAC module 341 determines the final numbers of the time slots assigned to the terminal-side apparatuses 100 to 130. For this purpose, the FG/HE HTSAC module 341 calculates, for each terminal-side apparatus, the sum of the number of the primarily assigned time slots (10, 20, 20, 0) and the number of the primary leftover time slots (0, 5, 5, 0) reassigned at the step 404. The FG/HE HTSAC module 341 designates the sums, that is, 10, 25, 25, and 0, as the final numbers of the time slots assigned to the terminal-side apparatuses 100 to 130.

In the manner described above, the FG/HE HTSAC module 341 of the present invention assigns the time slots to the terminal-side apparatuses 100 to 130 in accordance with the fairness criteria and then reassigns the excessive time slots thereto. This operation ensures fairness among the terminal-side apparatuses 100 to 130 and permits efficient assignment of time slots.

Next, a second embodiment of the present invention will be described referring to the drawings. In the second embodiment, time slots are assigned to all terminal-side apparatuses in accordance with the fairness criteria. FIG. 8A is a view for use in describing assignment of time slots at the step 400 in FIG. 4 on the basis of the fairness criteria. The terminal-side apparatuses 100 to 130 in this embodiment have queue lengths of 10, 50, 40, and 0, respectively in their buffers. It is assumed that the total number of the time slots available for the terminal-side apparatuses 100 to 130 is 60.

In FIG. 8A, the FG/HE HTSAC module 341 assigns, at the step 400, time slots equally to all terminal-side apparatuses 100 to 130. As a result, the terminal-side apparatuses 100, 110, 120, and 130 are assigned with fifteen time slots for each. The number of the primarily assigned time slots exceeds the queue length (i.e., 10) in the terminal-side apparatus 100. Likewise, number of the primarily assigned time slots exceeds the queue length (i.e., 0) in the terminal-side apparatus 130. Therefore, at the step 401 in FIG. 4, the FG/HE HTSAC module 341 determines that reassignment should be performed for efficiency improvement.

At the step 403 in FIG. 4, the FG/HE HTSAC module 341 calculates the difference between the number of the primarily assigned time slots (i.e., 15) to the terminal-side apparatus 100 and the queue length (i.e., 10) stored therein. Likewise, the FG/HE HTSAC module 341 calculates the difference between the number of the primarily assigned time slots (i.e., 15) to the terminal-side apparatus 130 and the queue length (i.e., 0) stored therein. Next, the FG/HE HTSAC module 341 calculates the sum of these differences. Furthermore, the FG/HE HTSAC module 341 determines the sum (i.e., 20) as the number of the primary leftover time slots to be subjected to reassignment.

At the step 404 in FIG. 4, the FG/HE HTSAC module 341 performs reassignment for efficiency improvement. In the example shown in FIG. 8A, the FG/HE HTSAC module 341 reassigns the twenty leftover time slots to the terminal-side apparatuses 110 and 120. More specifically, the terminal-side apparatuses 110 and 120 are assigned with ten leftover time slots for each. Finally, at the step 405 in FIG. 4, the FG/HE HTSAC module 341 determines that 10, 25, 25, and 0 time slots in total are assigned to the terminal-side apparatuses 100, 110, 120, and 130, respectively.

In the second embodiment, the FG/HE HTSAC module 341 does not restrict the terminal-side apparatus(es) to which the time slots are to be assigned in accordance with the fairness criteria. This embodiment also assures the fairness among the terminal-side apparatuses 100 to 130 and permits efficient time slot assignment, as in the first embodiment.

FIG. 9 is a block diagram illustrating a configuration of the above-mentioned FG/HE HTSAC module 341. The FG/HE HTSAC module 341 in FIG. 9 comprises a fairness guarantee assignment circuit 900, an assignment information management table 901, a reassignment determination circuit 902, a reassigned terminal-side apparatus determination circuit 903, a reassigned time slots determination circuit 904, an efficiency improvement reassignment circuit 905, and an assigned time slots transmission circuit 906.

The fairness guarantee assignment circuit 900 computes assignment of the time slots to the terminal-side apparatuses 100 to 130 in accordance with the fairness criteria at the timing of changing the time slot assignment. The fairness guarantee assignment circuit 900 then writes the computation results into the assignment information management table 901. Subsequently, the fairness guarantee assignment circuit 900 notifies the reassignment determination circuit 902 of the completion of the assignment in accordance with the fairness criteria. In this event, the fairness guarantee assignment circuit 900 may assign the time slots to the terminal-side apparatus 100 to 130 in various ways. Examples include assignment of the time slots to all terminal-side apparatuses 100 to 130, which corresponds to the second embodiment, and assignment of the time slots to only one or more terminal-side apparatuses where the queue length exceeds a predetermined threshold value, which corresponds to the first embodiment.

For the assignment of the time slots in accordance with the fairness criteria, different fairness criteria may be applied such as those described in the first embodiment. As shown in FIG. 10, the assignment information management table 901 comprises a queue length field 911, an assigned time slots field 912, and a reassignment flag field 913. The queue length field 911 contains the queue length information in the terminal-side apparatus. The assigned time slots field 912 contains information indicative of the number of the time slots assigned to the corresponding terminal-side apparatus. The reassignment flag field 913 contains information indicative of flags associated with reassignment. In response to the queue length information supplied from the terminal-side apparatuses 100 to 130, the queue length field 911 is updated. When the fairness guarantee assignment circuit 900 completes the above-mentioned assignment, it writes the result into the assigned time slots field 912. Updates of the assigned time slots field 912 will be described later. The reassignment flag field 913 will also be described later.

In response to the notice indicative of completion of the primary assignment from the fairness guarantee assignment circuit 900, the reassignment determination circuit 902 obtains, from the assignment information management table 901, the information indicative of the number of the primarily assigned time slots as well as the queue length information. The reassignment determination circuit 902 then determines, based on the information obtained, whether or not the reassignment should be carried out. More specifically, the reassignment determination circuit 902 compares the number of the primarily assigned time slots with the queue length for each terminal-side apparatus. If the number of the primarily assigned time slots exceeds the queue length in one or more terminal-side apparatuses, then the reassignment determination circuit 902 determines that the reassignment should be performed. The reassignment determination circuit 902 supplies a control trigger to the reassigned terminal-side apparatus determination circuit 903 accordingly.

On the contrary, when the number of the primarily assigned time slots is smaller than the queue length for all terminal-side apparatuses 100 to 130, the reassignment determination circuit 902 determines not to perform the reassignment. The reassignment determination circuit 902 supplies the numbers of the primarily assigned time slots to the assignment time slots transmission circuit 906.

In response to the control trigger supplied from the reassignment determination circuit 902, the reassigned terminal-side apparatus determination circuit 903 obtains, from the assignment information management table 901, the information indicative of the number of the primarily assigned time slots as well as the queue length information. The reassigned terminal-side apparatus determination circuit 903 determines available terminal-side apparatus(es) for reassignment. More specifically, the reassigned terminal-side apparatus determination circuit 903 designates, as the available terminal-side apparatus(es) for reassignment, the terminal-side apparatus(es) having the number of the primarily assigned time slots being smaller than the queue length. The reassigned terminal-side apparatus determination circuit 903 excludes the remaining terminal-side apparatus(es) from the subjects of the reassignment. Then, the reassigned terminal-side apparatus determination circuit 903 writes "reassigned" or "not reassigned" in the reassignment flags field 913 for the corresponding terminal-side apparatus in the assignment information management table 901. The reassigned terminal-side apparatus determination circuit 903 supplies a control trigger to the reassignment time slots determination circuit 904.

In response to the control trigger from the reassigned terminal-side apparatus determination circuit 903, the reassignment time slots determination circuit 904 obtains, from the assignment information management table 901, the information indicative of the number of the primarily assigned time slots to the non-available terminal-side apparatus for reassignment as well as the queue length information therefor. The reassignment time slots determination circuit 904 determines the number of the primary leftover time slots to be reassigned. More specifically, the reassignment time slots determination circuit 904 calculates the difference between the number of the primarily assigned time slots and the queue length for each of the non-available terminal-side apparatuses for reassignment. The reassignment time slots determination circuit 904 determines the sum of the differences as the number of the primary leftover time slots to be reassigned. In addition, the reassignment time slots determination circuit 904 designates the queue length as the number of the time slots assigned to the corresponding non-available terminal-side apparatus for reassignment. The reassignment time slots determination circuit 904 writes the determined number of the time slots into the assigned time slots field 912 for the non-available terminal-side apparatus for reassignment in the assignment information management table 901 to update this field.

After calculation of the number of the primary leftover time slots to be reassigned, the reassignment time slots determination circuit 904 notifies the efficiency improvement reassignment circuit 905 of this number. In response to this notice, the efficiency improvement reassignment circuit 905 obtains, from the assignment information management table 901, the queue length information for the available terminal-side apparatus(es) for reassignment. The efficiency improvement reassignment circuit 905 reassigns the number of the primary leftover time slots to the available terminal-side apparatus(es). This reassignment may be made in various ways including those described in the first embodiment.

If the total number of the time slots assigned to the available terminal-side apparatus exceeds the queue length as a result of the primary reassignment, the reassigned terminal-side apparatus determination circuit 903 excludes the corresponding terminal-side apparatus(es) from the subjects of the secondary reassignment. The reassigned terminal-side apparatus determination circuit 903 designates the queue length in the non-available terminal-side apparatus (es) for reassignment as the number of the time slots assigned thereto.

The reassignment time slots determination circuit 904 determines the difference between the number of the time slots assigned previously (i.e., the sum of the primarily assigned time slots and the primary leftover time slots) and the queue length as the number of the secondary leftover time slots. Then, the reassignment time slots determination circuit 904 reassigns the secondary leftover time slots to the available terminal-side apparatus(es) by using any one of the above-mentioned methods. The FG/HE HTSAC module 341 repeats the same procedures until the number of the time slots assigned becomes equal to or smaller than the queue length for all terminal-side apparatuses. It is noted that no terminal-side apparatus may become available for reassignment before completion of the operation even though one or more time slots still remain without being assigned. In such a case, the FG/HE HTSAC module 341 assigns all of the remaining time slots to all terminal-side apparatuses according to the fairness criteria used at the step 400.

When reassignment is performed, the efficiency improvement reassignment circuit 905 determines, as the total number of the time slots assigned to the terminal-side apparatuses 100 to 130, the sum of the number of the time slots contained in the assignment time slots field 912 in the assignment management table 901 and the number of the leftover time slots reassigned. The efficiency improvement reassignment circuit 905 notifies the assigned time slots transmission circuit 906 of the determined number of the time slots.

The assigned time slots transmission circuit 906 supplies the information indicative of the number of the time slots to be assigned to the terminal-side apparatuses 100 to 130 through the downstream transmission line 190, in response to reception of this information from the reassignment determination circuit 902 or the assigned time slots transmission circuit 906.

As described above, according to the configuration shown in FIG. 9, the FG/HE HTSAC module can achieve the time slot assignment methods described in conjunction with the first and second embodiments.

The first embodiment of the present invention is advantageous in that the fairness can be assured among the terminal-side apparatuses with efficient use of the transmission bandwidths. This is because the method for assigning the time slots according to the present invention allows the network-side apparatus to assign the time slots to the terminal-side apparatuses in accordance with the fairness criteria, assuring fairness among the terminal-side apparatuses. If there is the terminal-side apparatus having the number of the time slots assigned exceeding the queue length, the network-side apparatus reassigns the excessive time slots. This prevents excessive assignment of the time slots while keeping the fairness, making efficient use of the transmission bandwidths.

Modifications of the invention herein disclosed will occur to person skilled in the art and all such modifications are deemed to be within the scope of the invention as defined by the appended claims.

What is claimed is:

1. A system for assigning time slots in a packet communication system comprising a network-side apparatus and a plurality of terminal-side apparatuses connected to the network-side apparatus through a shared transmission medium, the network-side apparatus assigning time slots to the terminal-side apparatuses, each of the terminal-side apparatuses transferring one or more packets over the shared transmission medium by using the time slots assigned thereto, the terminal-side apparatus comprising:
buffering means for use in storing the packets to be transferred; and
notification means connected to said buffering means and the network-side apparatus, said notification means supplying, to the network-side apparatus, information indicative of the number of the packets stored in said buffering means as packets information;

the network-side apparatus comprising:
control means connected to each of the terminal-side apparatuses, said control means assigning, in response to the packets information supplied from each of the terminal-side apparatuses, time slots to the terminal-side apparatuses in accordance with a predetermined fairness criteria, the time slots being assigned as primarily assigned time slots, and
when one or more leftover time slots are present in at least one terminal-side apparatuses after the assignment of the primarily assigned time slots, then said control means:
designating the terminal-side apparatus(es) with such leftover time slot(s) as non-available terminal-side apparatus(es) for reassignment and the remaining terminal-side apparatus(es) as available terminal-side apparatus(es) for reassignment, and
reassigning the leftover time slot(s) to the available terminal-side apparatus(es) for reassignment.

2. A system as claimed in claim 1, wherein said control means compares the number of the primarily assigned time slots with the number of the packets stored, and designates the number of the primarily assigned time slots as the final number of the time slots assigned to the terminal-side apparatuses when the number of the primarily assigned time slots is smaller than the number of the packets stored for all terminal-side apparatuses.

3. A system as claimed in claim 1, wherein the fairness criteria is for assigning the time slots equally to the terminal-side apparatuses.

4. A system as claimed in claim 1, wherein the fairness criteria is for assigning the time slots to the terminal-side apparatuses in proportion to the sum of guaranteed minimum bandwidths for connections in the terminal-side apparatuses.

5. A system as claimed in claim 1, wherein the fairness criteria is for assigning the time slots to the terminal-side apparatuses in proportion to the sum of maximum bandwidths for connections in the terminal-side apparatuses.

6. A system as claimed in claim 1, wherein the fairness criteria is for assigning the time slots to the terminal-side apparatuses in proportion to the difference between the sum of maximum bandwidths and the sum of guaranteed minimum bandwidths for connections in the terminal-side apparatuses.

7. A system as claimed in claim 1, wherein the fairness criteria is for assigning the time slots to the terminal-side apparatuses in proportion to the number of connections in the terminal-side apparatuses.

8. A system as claimed in claim 1, wherein the fairness criteria is for assigning a part of total time slots equally to the terminal-side apparatuses and then assigning the remaining time slots in proportion to the sum of guaranteed minimum bandwidths for connections in the terminal-side apparatuses.

9. A system as claimed in claim 1, wherein the fairness criteria is for assigning a part of total time slots equally to the terminal-side apparatuses and then assigning the remaining time slots in proportion to the sum of maximum bandwidths for connections in the terminal-side apparatuses.

10. A system as claimed in claim 1, wherein the fairness criteria is for assigning a part of total time slots equally to the terminal-side apparatuses and then assigning the remaining time slots in proportion to the difference between the sum of maximum bandwidths and the sum of guaranteed minimum bandwidths for connections in the terminal-side apparatuses.

11. A system as claimed in claim 1, wherein the fairness criteria is for assigning a part of total time slots equally to the terminal-side apparatuses and then assigning the remaining time slots in proportion to the number of connections in the terminal-side apparatuses.

12. A system as claimed in claim 1, wherein said control means controls, on an equivalent assignment, reassignment of the leftover time slots to the available terminal-side apparatus(es) for reassignment.

13. A system as claimed in claim 1, wherein said control means controls reassignment of the leftover time slots to the available terminal-side apparatus(es) for reassignment, such that the value obtained by subtracting the number of the primarily assigned time slots from the number of the packets to be transferred becomes minimum in the available terminal-side apparatus(es) for reassignment.

14. A system as claimed in claim 1, wherein said control means controls reassignment of the leftover time slots to the available terminal-side apparatus(es) for reassignment in proportion to the number of the packets to be transferred.

15. A system as claimed in claim 1, wherein the packet is a cell to be used in an asynchronous transfer mode.

16. A system for assigning time slots in a packet communication system comprising a network-side apparatus and a plurality of terminal-side apparatuses connected to the network-side apparatus through a shared transmission medium, the network-side apparatus assigning time slots to the terminal-side apparatuses, each of the terminal-side apparatuses transferring one or more packets over the shared transmission medium by using the time slots assigned thereto, the terminal-side apparatus comprising:
buffering means for use in storing the packets to be transferred; and
notification means connected to said buffering means and the network-side apparatus, said notification means supplying, to the network-side apparatus, information indicative of the number of the packets stored in said buffering means as packets information;

the network-side apparatus comprising:
control means connected to each of the terminal-side apparatuses, said control means assigning, in response to the packets information supplied from each of the terminal-side apparatuses time slots to the terminal-side apparatuses in accordance with a predetermined fairness criteria, the time slots being assigned as primarily assigned time slots, and
when one or more leftover time slots are present in at least one terminal-side apparatuses after the assignment of the primarily assigned time slots, then said control means:
designating the terminal-side apparatus(es) with such leftover time slot(s) as non-available terminal-side apparatus(es) for reassignment and the remaining terminal-side apparatus(es) as available terminal-side apparatus(es) for reassignment, reassigning the leftover time slot(s) to the available terminal-side apparatus(es) for reassignment, designating the sum of the differences between the number of the primarily assigned time slots to the non-available terminal-side apparatus(es) and the number of the packets stored, as the number of the leftover time slots to be reassigned, making the number of the primarily assigned time slots to the non-available terminal-side apparatus(es) for reassignment, be identical to the number of the packets stored, reassigning the leftover time slots to the available terminal-side apparatus(es) such that the number of the time slots to the available terminal-side apparatus(es) does not exceed the number of the packets stored, and if the number of the time slots assigned becomes equal to the number of the packets stored for all available terminal-side apparatuses and at least one leftover time slot remains unassigned, said control means:

assigning the remaining time slot(s) to all of the terminal-side apparatuses in accordance with the fairness criteria, and using the sum of the primarily assigned time slots and the number of the leftover time slots reassigned, as a final number of the time slots assigned to the corresponding terminal-side apparatus.

17. A network-side apparatus connected to a plurality of terminal-side apparatuses through a shared transmission medium in a packet communication system, the network-side apparatus assigning time slots to the terminal-side apparatuses, each of the terminal-side apparatuses having a buffer and transferring one or more packets over the shared transmission medium by using the time slots assigned thereto, the network-side apparatus comprising:

fairness assignment means connected to the terminal-side apparatuses, said fairness assignment means assigning time slots to the terminal-side apparatuses in accordance with a predetermined fairness criteria, in response to information indicative of the number of the packets stored in the buffer; and reassignment control means for use in, when one or more leftover time slots are present in at least one terminal-side apparatuses after the assignment of the primarily assigned time slots, designating the terminal-side apparatus(es) with such leftover time slot(s) as non-available terminal-side apparatus(es) for reassignment and the remaining terminal-side apparatus(es) as available terminal-side apparatus(es) for reassignment, to control reassignment of the leftover time slot(s) to the available terminal-side apparatus(es) for reassignment.

18. A network-side apparatus as claimed in claim 17, wherein said fairness assignment means comprises:

an assignment information management table for managing, for each of the terminal-side apparatuses, packets information corresponding to information indicative of the number of the packets stored in the terminal-side apparatus and supplied from the terminal-side apparatus, assigned time slots information corresponding to information indicative of the number of time slots assigned to the terminal-side apparatus, and identifier information indicating whether each of the terminal-side apparatus is available for reassignment or not; and a fairness guarantee assignment circuit for assigning the time slots to all or some of the terminal-side apparatuses in accordance with the fairness criteria at the timing when it is necessary to change assignment of the time slots, to write the number of the time slots assigned to the terminal-side apparatuses into the assignment information management table.

19. A network-side apparatus as claimed in claim 17, wherein the fairness criteria is for assigning the time slots equally to the terminal-side apparatuses.

20. A network-side apparatus as claimed in claim 17, wherein the fairness criteria is for assigning the time slots to the terminal-side apparatuses in proportion to the sum of guaranteed minimum bandwidths for connections in the terminal-side apparatuses.

21. A network-side apparatus as claimed in claim 17, wherein the fairness criteria is for assigning the time slots to the terminal-side apparatuses in proportion to the sum of maximum bandwidths for connections in the terminal-side apparatuses.

22. A network-side apparatus as claimed in claim 17, wherein the fairness criteria is for assigning the time slots to the terminal-side apparatuses in proportion to the difference between the sum of maximum bandwidths and the sum of guaranteed minimum bandwidths for connections in the terminal-side apparatuses.

23. A network-side apparatus as claimed in claim 17, wherein the fairness criteria is for assigning the time slots to the terminal-side apparatuses in proportion to the number of connections in the terminal-side apparatuses.

24. A network-side apparatus as claimed in claim 17, wherein the fairness criteria is for assigning a part of total time slots equally to the terminal-side apparatuses and then assigning the remaining time slots in proportion to the sum of guaranteed minimum bandwidths for connections in the terminal-side apparatuses.

25. A network-side apparatus as claimed in claim 17, wherein the fairness criteria is for assigning a part of total time slots equally to the terminal-side apparatuses and then assigning the remaining time slots in proportion to the sum of maximum bandwidths for connections in the terminal-side apparatuses.

26. A network-side apparatus as claimed in claim 17, wherein the fairness criteria is for assigning a part of total time slots equally to the terminal-side apparatuses and then assigning the remaining time slots in proportion to the difference between the sum of maximum bandwidths and the sum of guaranteed minimum bandwidths for connections in the terminal-side apparatuses.

27. A network-side apparatus as claimed in claim 17, wherein the fairness criteria is for assigning a part of total time slots equally to the terminal-side apparatuses and then assigning the remaining time slots in proportion to the number of connections in the terminal-side apparatuses.

28. A network-side apparatus as claimed in claim 17, wherein said control means controls, on an equivalent assignment, reassignment of the leftover time slots to the available terminal-side apparatus(es) for reassignment.

29. A network-side apparatus as claimed in claim 17, wherein said control means controls reassignment of the leftover time slots to the available terminal-side apparatus(es) for reassignment, such that the value obtained by subtracting the number of the primarily assigned time slots from the number of the packets stored becomes equal or similar to each other in the available terminal-side apparatus(es) for reassignment.

30. A network-side apparatus as claimed in claim 17, wherein said control means controls reassignment of the leftover time slots to the available terminal-side apparatus(es) for reassignment in proportion to the number of the packets to be transferred.

31. A network-side apparatus as claimed in claim 17, wherein the packet is a cell to be used in an asynchronous transfer mode.

32. A network-side apparatus connected to a plurality of terminal-side apparatuses through a shared transmission medium in a packet communication system to assign time slots to the terminal-side apparatuses, the terminal-side apparatus transferring one or more packets over the shared transmission medium by using the time slots assigned thereto, each of the terminal-side apparatuses having buffering means for use in storing the packets to be transferred and notification means connected to the buffering means and the network-side apparatus, the notification means supplying, to the network-side apparatus, information indicative of the number of the packets stored in the buffering means as packets information, the network-side apparatus further comprising:

fairness assignment means connected to the terminal-side apparatuses, said fairness assignment means assigning, in response to the packets information, time slots to the terminal-side apparatuses in accordance with a predetermined fairness criteria, the time slots being assigned as primarily assigned time slots, reassignment control means for use in designating, when one or more leftover time slots are present in at least one terminal-side apparatuses after the assignment of the primarily assigned time slots, the terminal-side apparatus(es) with such leftover time slot(s) as non-available terminal-side apparatus(es) for reassignment and the remaining terminal-side apparatus(es) as available terminal-side apparatus(es) for reassignment, and reassigning the leftover time slot(s) to the available terminal-side apparatus(es) for reassignment, an assignment information management table for managing, for each of the terminal-side apparatuses, packets information corresponding to information indicative of the number of the packets stored in the terminal-side apparatus, the packets information being supplied from the terminal-side apparatus, assigned time slots information corresponding to information indicative of the number of the time slots assigned to the terminal-side apparatus as the number of the primarily assigned time slots, and identifier information indicating whether each of the terminal-side apparatus is available for reassignment or not; and an assigned time slots transmission circuit for use in supplying, the assigned time slots information to the terminal-side apparatuses, said fairness assignment means comprising a fairness guarantee assignment circuit for assigning the time slots to all or some of the terminal-side apparatuses in accordance with the fairness criteria at the timing when it is necessary to change assignment of the time slots, to write the number of the primarily assigned time slots into said assignment information management table;

said reassignment control means comprising:

a reassignment determination circuit for use in obtaining, for each of the terminal-side apparatuses, the assigned time slots information and the packets information by means of looking up said assignment information management table, to compare the number of the primarily assigned time slots and the number of the packets stored for each of the terminal-side apparatuses, said reassignment determination circuit determining to perform reassignment when the number of the primarily assigned time slots exceeds the number of the packets stored for at least one terminal-side apparatus, said reassignment determination circuit determining not to perform reassignment when the number of the primarily assigned time slots is smaller than the number of the packets stored for all terminal-side apparatuses, and in designating the number of the primarily assigned time slots as the number of the time slots assigned to the terminal-side apparatus to send the determined number of the time slots to the assigned time slots transmission circuit;

a reassigned terminal-side apparatus determination circuit for use in obtaining, for each of the terminal-side apparatuses, the assigned time slots information and the packets information by means of looking up said assignment information management table when said reassignment determination circuit determines to perform reassignment, and in designating the terminal-side apparatus(es) as available terminal-side apparatus(es) for reassignment where the number of the primarily assigned time slots is smaller than the number of the packets stored and the remaining terminal-side apparatus(es) as non-available terminal-side apparatus(es), to write in said assignment information management table an identifier indicative of availability of the terminal-side apparatus for the reassignment;

a reassigned time slots determination circuit for use in obtaining, for the non-available terminal-side apparatus(es), the assigned time slots information and the packets information by means of looking up said assignment information management table, and designating the sum of the differences between the number of the primarily assigned time slots and the number of the packets stored as the number of the leftover time slots to be reassigned, to update said assignment information management table with the number of the packets stored applied to the number of the primarily assigned time slots for the non-available terminal-side apparatus(es); and an efficiency improvement reassignment circuit connected to assigned time slots transmission circuit, said efficiency improvement reassignment circuit for use in:

obtaining the packets information for the available terminal-side apparatus(es) for reassignment and the assigned time slots information for all terminal-side apparatuses by means of looking up said assignment information management table, and reassign the number of the leftover time slots to the available terminal-side apparatus(es) for reassignment such that the number of the time slots assigned to the available terminal-side apparatus(es) for reassignment is equal to or smaller than the number of the packets stored, and as a result of this reassignment, if the number of the time slots assigned to the available terminal-side apparatus(es) for reassignment is larger than the number of the packets stored, then designating the available terminal-side apparatus(es) as non-available terminal-side apparatus(es) for reassignment with the number of the packets stored used as the number of the time slots assigned thereto, and reassigning, to the available terminal-side apparatus(es) for reassignment, the difference between the number of the time slots already assigned to the available terminal-side apparatus for reassignment and the number of the packets stored as the number of the leftover time slots, which is repeated until the number of the time slots assigned to the available terminal-side apparatuses becomes equal to or smaller than the number of the packets stored for all available terminal-side apparatuses, and assigning, if no terminal-side apparatus is available for reassignment before completion of the reassignment even though one or more time slots still remain without being assigned, all leftover time slots for reassignment to the terminal-side apparatuses in accordance with the fairness criteria determining, as the number of the time slots assigned to the terminal-side apparatuses, the sum of the number of the primarily assigned time slots obtained from said assignment information management table and the number of the leftover time slots already reassigned, to send the determined number of the time slots to the assigned time slots transmission circuit.

33. A method for assigning time slots in a packet communication system comprising a network-side apparatus and a plurality of terminal-side apparatuses connected to the network-side apparatus through a shared transmission medium, the network-side apparatus having control means and assigning time slots to the terminal-side apparatuses, each of the terminal-side apparatuses having a buffer and transferring one or more packets to the shared transmission medium by using the time slots assigned thereto, the method comprising the steps of:

supplying, from each of the terminal-side apparatuses, information indicative of the number of the packets stored in the buffer as packets information; and assigning, by the control means in the network-side apparatus, in response to the packets information supplied from each of the terminal-side apparatuses, time slots to the terminal-side apparatuses in accordance with a predetermined fairness criteria, the time slots being assigned as primarily assigned time slots; and controlling, when one or more leftover time slots are present in at least one terminal-side apparatuses after the assignment of the primarily assigned time slots, to designate the terminal-side apparatus(es) with such leftover time slot(s) as non-available terminal-side apparatus(es) for reassignment and the remaining terminal-side apparatus(es) as available terminal-side apparatus(es) for reassignment, and reassigning the leftover time slot(s) to the available termin reassignment.

34. A method as claimed in claim 33, wherein the control means compares the number of the primarily assigned time slots with the number of the packets stored, and designates the number of the primarily assigned time slots as the final number of the time slots assigned to the terminal-side apparatuses when the number of the primarily assigned time slots is smaller than the number of the packets stored for all terminal-side apparatuses.

35. A method as claimed in claim 33, wherein the fairness criteria is for assigning the time slots equally to the terminal-side apparatuses.

36. A method as claimed in claim 33, wherein the fairness criteria is for assigning the time slots to the terminal-side apparatuses in proportion to the sum of guaranteed minimum bandwidths for the connections in the terminal-side apparatuses.

37. A method as claimed in claim 33, wherein the fairness criteria is for assigning the time slots to the terminal-side apparatuses in proportion to the sum of maximum bandwidths for the connections in the terminal-side apparatuses.

38. A method as claimed in claim 33, wherein the fairness criteria is for assigning the time slots to the terminal-side apparatuses in proportion to the difference between the sum of maximum bandwidths and the sum of guaranteed minimum bandwidths for the connections in the terminal-side apparatuses.

39. A method as claimed in claim 33, wherein the fairness criteria is for assigning the time slots to the terminal-side apparatuses in proportion to the number of connections in the terminal-side apparatuses.

40. A method as claimed in claim 33, wherein the fairness criteria is for assigning a part of total time slots equally to the terminal-side apparatuses and then assigning the remaining time slots in proportion to the sum of guaranteed minimum bandwidths for the connections in the terminal-side apparatuses.

41. A method as claimed in claim 33, wherein the fairness criteria is for assigning a part of total time slots equally to the terminal-side apparatuses and then assigning the remaining time slots in proportion to the sum of maximum bandwidths for the connections in the terminal-side apparatuses.

42. A method as claimed in claim 33, wherein the fairness criteria is for assigning a part of total time slots equally to the terminal-side apparatuses and then assigning the remaining time slots in proportion to the difference between the sum of maximum bandwidths and the sum of guaranteed minimum bandwidths for the connections in the terminal-side apparatuses.

43. A method as claimed in claim 33, wherein the fairness criteria is for assigning a part of total time slots equally to the terminal-side apparatuses and then assigning the remaining time slots in proportion to the number of connections in the terminal-side apparatuses.

44. A method as claimed in claim 33, wherein the control means controls, on an equivalent assignment, reassignment of the leftover time slots to the available terminal-side apparatus(es) for reassignment.

45. A method as claimed in claim 33, wherein the control means controls reassignment of the leftover time slots to the available terminal-side apparatus(es) for reassignment, such that the value obtained by subtracting the number of the primarily assigned time slots from the number of the packets stored becomes equal or similar to each other in the available terminal-side apparatus(es) for reassignment.

46. A method as claimed in claim 33, wherein the control means controls reassignment of the leftover time slots to the available terminal-side apparatus(es) for reassignment in proportion to the number of the packets to be transferred.

47. A method as claimed in claim 33, wherein the packet is a cell to be used in an asynchronous transfer mode.

48. A method as claimed in claim 33, wherein the controlling step comprises the steps of designating the sum of the differences between the number of the primarily assigned time slots to the non-available terminal-side apparatus(es) and the number of the packets stored, as the number of the leftover time slots to be reassigned, making the number of the primarily assigned time slots to the non-available terminal-side apparatus(es) for reassignment, be identical to the number of the packets stored, reassigning the leftover time slots to the available terminal-side apparatus(es) such that the number of the time slots to the available terminal-side apparatus(es) does not exceed the number of the packets stored, and if the number of the time slots assigned becomes equal to the number of the packets stored for all available terminal-side apparatuses and at least one leftover time slot remains unassigned, assigning the remaining time slot(s) to all of the terminal-side apparatuses in accordance with the fairness criteria, and using the sum of the primarily assigned time slots and the number of the leftover time slots reassigned, as a final number of the time slots assigned to the corresponding terminal-side apparatus.

\* \* \* \* \*